United States Patent
Altman et al.

(10) Patent No.: US 9,479,523 B2
(45) Date of Patent: Oct. 25, 2016

(54) SYSTEM AND METHOD FOR AUTOMATED CONFIGURATION OF INTRUSION DETECTION SYSTEMS

(71) Applicant: Verint Systems Ltd., Herzelia, Pituach (IL)

(72) Inventors: Yuval Altman, Herzeliya (IL); Assaf Yosef Keren, Ramat Gan (IL)

(73) Assignee: VERINT SYSTEMS LTD., Herzilya Pituach (IL)

( * ) Notice: Subject to any disclaimer, the term of this patent is extended or adjusted under 35 U.S.C. 154(b) by 2 days.

(21) Appl. No.: 14/263,097

(22) Filed: Apr. 28, 2014

(65) Prior Publication Data

US 2014/0325653 A1    Oct. 30, 2014

(30) Foreign Application Priority Data

Apr. 28, 2013 (IL) .......................................... 226057

(51) Int. Cl.
  *G06F 11/00* (2006.01)
  *H04L 29/06* (2006.01)

(52) U.S. Cl.
  CPC ....... *H04L 63/1416* (2013.01); *H04L 63/0227* (2013.01)

(58) Field of Classification Search
  CPC ......... G06F 21/60; G06F 21/55; H04L 63/12
  USPC ....................... 726/21–23; 713/194; 709/220
  See application file for complete search history.

(56) References Cited

U.S. PATENT DOCUMENTS

| | | | | |
|---|---|---|---|---|
| 6,587,124 B1 * | 7/2003 | Slaby | .................. | H04L 41/0856 715/735 |
| 6,741,992 B1 * | 5/2004 | McFadden | ............. | G06Q 10/10 |
| 7,134,141 B2 * | 11/2006 | Crosbie | ................. | G06F 21/552 709/224 |
| 7,225,343 B1 * | 5/2007 | Honig | .................... | G06F 21/554 713/189 |
| 8,122,007 B2 * | 2/2012 | Mayer | ............... | G06F 17/30398 707/713 |
| 8,165,449 B2 * | 4/2012 | Ludwig | ................ | G11B 27/031 386/239 |
| 8,176,527 B1 * | 5/2012 | Njemanze | ............. | G06F 21/554 709/223 |
| 8,224,761 B1 * | 7/2012 | Rockwood | ....................... | 706/47 |
| 8,402,543 B1 * | 3/2013 | Ranjan | ................ | H04L 63/1416 726/23 |
| 8,499,348 B1 | 7/2013 | Rubin | | |
| 8,578,493 B1 * | 11/2013 | Cowan | .................. | G06F 21/554 709/224 |
| 8,682,812 B1 | 3/2014 | Ranjan | | |
| 8,762,948 B1 * | 6/2014 | Zaitsev | ............... | G06F 9/45558 717/124 |
| 8,838,951 B1 * | 9/2014 | Hicks et al. | ................... | 713/100 |
| 8,839,417 B1 * | 9/2014 | Jordan | ............................ | 726/22 |

(Continued)

OTHER PUBLICATIONS

Bilge, Leyla, et al., "Exposure: Finding Malicious Domains Using Passive DNS Analysis," 2014, 17 pages.

(Continued)

*Primary Examiner* — Dede Zecher
*Assistant Examiner* — Viral Lakhia
(74) *Attorney, Agent, or Firm* — Meunier Carlin & Curfman

(57) ABSTRACT

Methods and systems for automated generation of malicious traffic signatures, for use in Intrusion Detection Systems (IDS). A rule generation system formulates IDS rules based on traffic analysis results obtained from a network investigation system. The rule generation system then automatically configures the IDS to apply the rules. An analysis process in the network investigation system comprises one or more metadata filters that are indicative of malicious traffic. An operator of the rule generation system is provided with a user interface that is capable of displaying the network traffic filtered in accordance with such filters.

12 Claims, 1 Drawing Sheet

(56) References Cited

U.S. PATENT DOCUMENTS

| | | | |
|---|---|---|---|
| 8,850,579 B1* | 9/2014 | Kalinichenko | 726/23 |
| 2003/0097439 A1 | 5/2003 | Strayer et al. | |
| 2007/0186284 A1 | 8/2007 | McConnell | |
| 2008/0028463 A1 | 1/2008 | Dagon et al. | |
| 2008/0141376 A1 | 6/2008 | Clausen et al. | |
| 2009/0106842 A1* | 4/2009 | Durie | 726/25 |
| 2009/0216760 A1 | 8/2009 | Bennett | |
| 2010/0037314 A1 | 2/2010 | Perdisci | |
| 2010/0071065 A1 | 3/2010 | Khan et al. | |
| 2010/0100949 A1* | 4/2010 | Sonwane | H04L 63/20 726/7 |
| 2011/0099620 A1 | 4/2011 | Stavrou et al. | |
| 2012/0017281 A1 | 1/2012 | Banerjee | |
| 2012/0167221 A1 | 6/2012 | Kang et al. | |
| 2012/0311708 A1 | 12/2012 | Agarwal et al. | |
| 2013/0014253 A1 | 1/2013 | Neou | |
| 2013/0333038 A1 | 12/2013 | Chien | |
| 2014/0075557 A1* | 3/2014 | Balabine | H04L 63/20 726/23 |
| 2014/0207917 A1* | 7/2014 | Tock et al. | 709/220 |
| 2014/0298469 A1* | 10/2014 | Marion et al. | 726/23 |
| 2015/0135326 A1 | 5/2015 | Bailey, Jr. | |

OTHER PUBLICATIONS

Dietrich, C.J., et al., "CoCoSport: Clustering and recognizing botnet command and control channels using traffic analysis," Computer Networks, vol. 57, 2013, pp. 475-486.

Eslahi, M., "botAnalytics: Improving HTTP-Based Botnet Detection by Using Network Behavior Analysis system," Dissertation, Faculty of Computer Science and Information Technology, University of Malaya, 2010, 124 pages.

European Search Report and Preliminary Opinion, dated Jan. 15, 2014, received in connection with corresponding European Application No. 13165912.

Gu, G., et al., "BotMiner: Clustering Analysis of Network Traffic for Protocol- and Structure-Independent Botnet Detection," USENIX Security Symposium, vol. 5, No. 2, XP61009228, 2008, 16 pages.

Gu, G., et al., "BotSniffer: Detecting Botnet Command and Control Channels in Network Traffic," Proceedings of the 15$^{th}$ Annual Network and Distributed System Security Symposium (NDSS'08), San Diego, California, 2008, 18 pages.

Jacob, G., et al., "Jackstraws: Picking Command and Control Connections from Bot Traffic," Proceedings of the 20$^{th}$ USENIX Security Symposium, San Francisco, 2011, 16 pages.

Livadas, C., et al., "Using Machine Learning Techniques to Identify Botnet Traffic," In 2$^{nd}$ IEEE LCN Workshop on Network Security (WoNS'2006), 2006, pp. 967-974.

Rieck, K., et al., "Botzilla: Detecting the 'Phoning Home' of Malicious Software," Proceedings of the ACM Symposium on Applied Computing (SAC), Sierre, Switzerland, 2010, 7 pages.

Wang, H., et al., "NetSpy: Automatic Generation of Spyware Signatures for NIDS," Proceedings of the 22$^{nd}$ Annual Computer Security Applications Conference, Miami Beach, Florida, Dec. 2006, ten pages.

* cited by examiner

SYSTEM AND METHOD FOR AUTOMATED CONFIGURATION OF INTRUSION DETECTION SYSTEMS

FIELD OF THE DISCLOSURE

The present disclosure relates generally to network intrusion detection, and particularly to methods and systems for configuration of intrusion detection systems.

BACKGROUND OF THE DISCLOSURE

Various types of malicious software, such as viruses, worms and Trojan horses, are used for conducting illegitimate operations in computer systems. Malicious software may be used, for example, for causing damage to data or equipment, or for extracting or modifying data. Some types of malicious software communicate with a remote host, for example for Command and Control (C&C) purposes.

Various techniques for detecting malicious software are known in the art. For example, Rieck et al. describe methods for detecting malicious software at a point when it initiates contact with its maintainer, in "Botzilla: Detecting the 'Phoning Home' of Malicious Software," Proceedings of the ACM Symposium on Applied Computing (SAC), Sierre, Switzerland, Mar. 22-26, 2010, which is incorporated herein by reference.

Jacob et al. describes a system for identifying C&C connections, in "JACKSTRAWS: Picking Command and Control Connections from Bot Traffic," Proceedings of the 20$^{th}$ Usenix Security Symposium, San Francisco, Calif., Aug. 8-12, 2011, which is incorporated herein by reference.

Gu et al. describe a method that uses network-based anomaly detection to identify botnet C&C channels in a local area network, in "BotSniffer: Detecting Botnet Command and Control Channels in Network Traffic," Proceedings of the 15$^{th}$ Annual Network and Distributed System Security Symposium (NDSS'08), San Diego, Calif., February, 2008, which is incorporated herein by reference.

Gu et al. describe a C&C detection framework that is independent of botnet C&C protocol and structure, in "BotMiner: Clustering Analysis of Network Traffic for Protocol- and Structure-Independent Botnet Detection," Proceedings of the 17$^{th}$ USENIX Security Symposium, San Jose, Calif., 2008, which is incorporated herein by reference.

Eslahi describes methods for detecting HTTP-based Botnets based on network behaviour analysis, in "botAnalytics: Improving HTTP-Based Botnet Detection by Using Network Behavior Analysis System," Faculty of Computer Science and Information Technology, University of Malaya, 2010, which is incorporated herein by reference.

Wang et al. describe a tool that automatically generates network-level signatures for spyware, in "NetSpy: Automatic Generation of Spyware Signatures for NIDS," Proceedings of the 22$^{nd}$ Annual Computer Security Applications Conference, Miami Beach, Fla., December, 2006, which is incorporated herein by reference.

SUMMARY OF THE DISCLOSURE

An embodiment that is described herein provides a method including receiving from a network investigation system one or more combinations of metadata parameters that are indicative of malicious traffic within network traffic. One or more Intrusion Detection System (IDS) rules, which identify the malicious traffic, are formulated based on the received combinations of the metadata parameters. An IDS is configured to identify the malicious traffic in the network traffic, by provisioning the IDS with the IDS rules.

In some embodiments, formulating the IDS rules includes defining the rule based on data content of the network traffic in addition to the combinations of the metadata parameters. In an embodiment, formulating the IDS rules includes presenting to an operator at least part of the network traffic, filtered in accordance with the combinations of the metadata parameters, and formulating the IDS rules based on input from the operator. Presenting the network traffic to the operator may include automatically selecting a partial subset of the combinations of the metadata parameters, and presenting the network traffic filtered only in accordance with the selected partial subset.

In a disclosed embodiment, formulating the IDS rules includes modifying the combinations of the metadata parameters, until finding the combinations that are characteristic of the malicious traffic, and then automatically generating an IDS rule that matches the found combinations. Automatically generating the IDS rule may include automatically generating a regular expression that matches the found combinations.

In another embodiment, configuring the IDS includes verifying a performance of an IDS rule in the IDS prior to configuring the IDS to apply the IDS rule to live network traffic. Verifying the performance may include requesting an operator to modify the IDS rule in response to detecting that the performance of the IDS rule is insufficient.

There is additionally provided, in accordance with an embodiment that is described herein, apparatus, including first and second interfaces and a processor. The first interface is configured for communicating with a network investigation system. The second interface is configured for communicating with an Intrusion Detection System (IDS). The processor is configured to receive from the network investigation system over the first interface one or more combinations of metadata parameters that are indicative of malicious traffic within network traffic, to formulate, based on the received combinations of the metadata parameters, one or more Intrusion Detection System (IDS) rules that identify the malicious traffic, and, using the second interface, to configure an IDS to identify the malicious traffic in the network traffic, by provisioning the IDS with the IDS rules.

The present disclosure will be more fully understood from the following detailed description of the embodiments thereof, taken together with the drawings in which:

DETAILED DESCRIPTION OF EMBODIMENTS

Overview

Intrusion Detection Systems (IDS) typically detect malicious traffic by monitoring network traffic and applying a predefined set of rules to the monitored traffic. The rules may comprise, for example, regular expressions or other types of signatures that are indicative of malicious traffic.

Embodiments that are described herein provide improved methods and systems for automated generation of malicious traffic signatures, for use in IDS. In some embodiments, a rule generation system formulates IDS rules based on traffic analysis results obtained from a network investigation system. In this context, the term "network investigation system" refers to any system that records netflow (possibly summarized flow records), full packet or metadata from the network, and allows for interactive investigation of the data collected. The rule generation system then automatically configures an IDS to apply the rules.

Typically, the analysis process in the network investigation system comprises one or more metadata filters, i.e., combinations of metadata parameters that are indicative of malicious traffic. An operator of the rule generation system is provided with a user interface that is capable of displaying the network traffic filtered in accordance with such filters. The operator is able to drill down as necessary, or change the metadata filtering, attempting to find combinations of metadata parameters that best characterize the malicious traffic.

Once the desired metadata parameters are found, the system automatically formulates one or more IDS rules in a format (e.g., Regex, SNORT rule) that is compatible with the IDS. In some disclosed embodiments, the rule generation system generates rules that depend not only on metadata, but also on traffic content or payload. In some embodiments, the rule generation system selects automatically which metadata filters to include in the IDS rules and which metadata filters to exclude. This capability enables the rule generation system to present to the operator additional traffic that is potentially malicious, in order to refine and improve the IDS rules. In some embodiments, newly-generated IDS rules are tested in the IDS and refined as needed, before they are applied to live traffic.

In summary, the methods and systems described herein provide an automated link between network investigation and IDS. These techniques enable fast and efficient generation and deployment of IDS rules. As such, the disclosed techniques are highly effective against zero-day attacks, i.e., malicious traffic patterns that are encountered for the first time.

System Description

Figure 1:
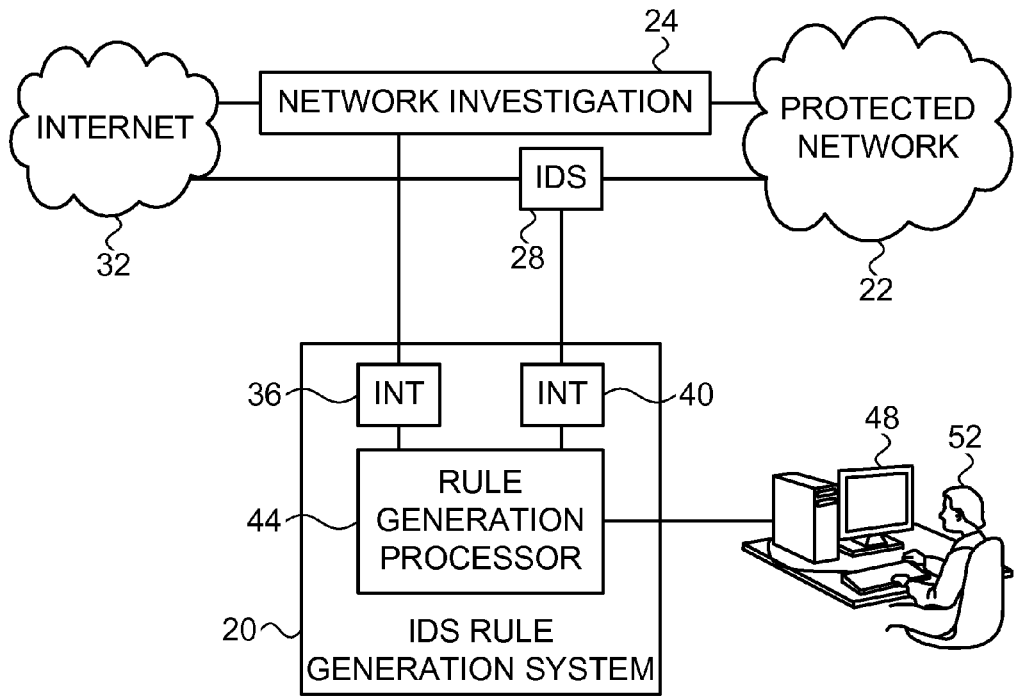
FIG. 1 is a block diagram that schematically illustrates a system for generating Intrusion Detection System (IDS) rules, in accordance with an embodiment that is described herein.

FIG. 1 is a block diagram that schematically illustrates an Intrusion Detection System (IDS) rule generation system 20, in accordance with an embodiment that is described herein. System 20 operates in conjunction with a network investigation system 24 and with an IDS 28, to protect a protected communication network 22 against malicious traffic. Network 22 typically comprises an Internet Protocol (IP) network, and may comprise, for example, an intranet of an organization or an Internet Service Provider (ISP) network.

In the present example, network 22 is connected to a Wide-Area Network (WAN) 32, for example the Internet. Most of the traffic between network 32 and computers in network 22 is typically innocent, but some of this traffic might be malicious, e.g., contain viruses, worms or Trojan horses. Malicious traffic may flow into and/or out of network 22.

Network investigation system 24 analysts analyze the traffic flowing between networks 32 and 22, attempting to detect and characterize malicious traffic. System 24 is also sometimes referred to as a network analytics system. The network investigation system typically captures communication packets, which comprise data and associated metadata. The metadata may comprise any suitable parameters that are descriptive of the data, as will be demonstrated below. Typically, an analyst defines in system 24 various filters that filter the traffic, each filter corresponding to a certain combination of metadata parameter values. System 24 filters the network traffic using these filters, typically with the assistance of the analyst, attempting to converge to filters (i.e., combinations of metadata and/or payload parameters) that are indicative of malicious traffic.

In parallel, IDS 28 monitors the traffic flowing between networks 32 and 22 and identifies malicious traffic by applying one or more IDS rules. When certain traffic, e.g., a flow of packets, matches one of the rules, IDS 28 blocks this flow or takes any other suitable responsive action. The functions of IDS 28 may be carried out, for example, by a Network Intrusion Detection System (NIDS), an Intrusion Prevention System (IPS) or any other suitable signature-based detection engine present in Network Security mechanisms, such as Next Generation Firewalls (NGFW), Unified Threat Management (UTM), Network-based anti-virus, and Security Information and Event Management (SIEM) systems. Thus, in the context of the present patent application and in the claims, the term "IDS" refers to any suitable signature-based detection engine, as well.

IDS rule generation system 20 bridges between investigation system 24 and IDS 28: System 20 formulates IDS rules for configuring IDS 28, based on the analysis results of investigation system 24. Typically, system 20 receives one or more of the filters from investigation system 24, uses the filters for formulating IDS rules, and then provisions the IDS rules in IDS 28. The process of generating IDS rules in system 20 is typically operator-assisted.

In the example of FIG. 1, system 20 comprises an interface 36 for communicating with investigation system 24, an interface 40 for communicating with IDS 28, and a rule generation processor 44 that carries out the methods described herein. Processor 44 interacts with an operator 42 using a suitable operator terminal 48 that comprises suitable input and output devices.

The configuration of system 20 shown in FIG. 1 is an example configuration, which is chosen purely for the sake of conceptual clarity. In alternative embodiments, any other suitable system configuration can also be used. For example, the functions of investigation system 24 and/or rule generation system 20 and/or IDS 28 may be implemented in a single system, e.g., on a single computing platform.

Some elements of system 20 may be implemented in hardware, e.g., in one or more Application-Specific Integrated Circuits (ASICs) or Field-Programmable Gate Arrays (FPGAs). Additionally or alternatively, some system elements can be implemented using software, or using a combination of hardware and software elements.

Some of the functions of system 20, such as the functions of rule generation processor 44, may be carried out using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Generation of IDS Rules Based on Investigation System Output

Investigation system 24 typically characterizes and filters the network traffic based on various metadata parameters. Examples of metadata parameters comprise the following:

The type of client application associated with the traffic.
Transmission Control Protocol (TCP) destination port of the traffic.
User Datagram Protocol (UDP) target port of the traffic.
Source country, from which the traffic originates.
Destination country, to which the traffic is destined.
Source organization, from which the traffic originates.
Destination organization, to which the traffic is destined.
Source city, from which the traffic originates.
Destination city, to which the traffic is destined.
Source domain, from which the traffic originates.
Destination domain, to which the traffic is destined.
Ethernet protocol.
Service type, e.g., MSN Instant Messaging (IM), Hypertext Transfer Protocol (HTTP), Domain Name Service (DNS) or any other suitable service type.
Hostname alias.
Source IP address.
Destination IP address.
Action event, e.g., "sendfrom" or "get".
E-mail address.
Content type, e.g., application or octet-stream.
Extension, e.g., ".htm" or none.
Attachment.
Filename and/or directory.

Additionally or alternatively, investigation system may use any other suitable type of metadata. In a typical forensic analysis process, the analyst investigates the network traffic using various filters, each filter comprising a certain combination of metadata parameters. The analyst modifies the filters iteratively until finding one or more filters (combinations of metadata parameters) that are indicative of malicious traffic. The filters are thus also referred to herein as metadata filters.

The traffic analyzed by investigation system 24 may originate from a real-time network feed, or from an off-line recording of network traffic, e.g., a Packet Capture (PCAP) file.

The analyst may define any suitable number of filters, each comprising any suitable combination of metadata parameters. The term "combination of metadata parameters" is meant to cover a single metadata parameter, as well, for example traffic originating from a particular hostname.

In some embodiments, IDS rule generation system 20 receives one or more of the metadata filters from investigation system 24 via interface 36. Processor 44 presents the traffic to operator 52 on terminal 48, filtered in accordance with the filters. Processor 44 typically supports a suitable Graphical User Interface (GUI) for this purpose.

Operator 52 may manipulate the presentation of the network traffic using the GUI, in order to find combinations of metadata parameter values that are characteristic of malicious traffic. For example, the operator may drill down to focus on specific parameter values, zoom out to combine multiple parameter values, and/or perform any other suitable modification to the traffic filtering and display.

At some stage, operator 52 decides that a certain filter (combination of metadata parameters) is highly indicative of malicious traffic. The operator indicates this decision to system 20, and requests the system to generate a corresponding IDS rule. In response to the request, processor 44 formulates an IDS rule that applies the metadata filter in question. Processor 44 may formulate the filter using any suitable standard or format, such as, for example, SNORT. Processor 44 configures IDS 28 with the IDS rule via interface 40. Once the IDS rule is provisioned in IDS 28, the IDS applies it to the monitored network traffic.

In some embodiments, operator 52 may define an IDS rule based on traffic data (also referred to as traffic payload) in addition to metadata. For example, in addition to some metadata-based filtering, the operator may further specify that the IDS rule find a match to some data pattern (e.g., a regular expression that is matched to the packet payload).

In an example process, processor 44 initially displays the network traffic to operator 52 filtered using some initial filters. The operator then decides to drill down into specific filters using the available metadata. In the present example operator 52 decides to examine the traffic to and from the United States (i.e., traffic for which the source country and/or destination country is the United States). The operator instructs processor 44 to drill down in this manner.

In response to the instruction, processor 44 displays the requested subset of US-related traffic, filtered in accordance with the available metadata filters. In this example, after examining the traffic to/from the US, the operator instructs processor 44 to drill down further, and display the traffic to/from a particular hostname. Within the traffic of that hostname, the operator may drill down even further to examine the actual packet data.

At this stage, operator 52 decides that the current metadata filter is to be translated into an IDS rule. The operator instructs processor 44 to perform this translation, e.g., using a "Create new IDS rule" button in the GUI. The rule in this example should identify the traffic to and from the hostname in question. Processor 44 responds by formulating an IDS rule (e.g., SNORT rule) accordingly.

In some embodiments, processor 44 formulates the IDS rule so as to depend only on a subset of the metadata filters that the analyst used. For example, in many cases the analyst focuses on a specific incident that he managed to identify, but the IDS rule attempts to detect similar activities as well. In an embodiment, processor 44 chooses automatically which of the metadata filters to include in the rule and which of the metadata filters to exclude. This generalization feature is especially helpful when testing an IDS rule: By excluding some of the metadata filters, more traffic will match the rule, and then operator 52 can narrow the traffic again after reviewing additional samples.

In some embodiments, processor 44 allows the operator to indicate which packet fields are of interest. In the present example, the operator chooses the query, directory and protocol fields. Processor 44 identifies that the fields indicated by the operator are string fields, and thus allows the operator to define regular expressions for these fields. (More generally, regular expression rules can also be used with binary or other non-textual fields.) The query field thus returns the following regular expression:

```
LCID=\ \d\ \d\ \d\ \d&OS=\ \d. . . . . . . . . . . . . . . . . . . . . . . . . . . .
. . . &SM=(?: [a-z] [a-z] +) . (?: [a-z] [a-z]+) &SPN=(?: [a-
z] [a-z] +) . *?(?: [a-z] [a-z] +) . *?(?: [a-z] [a-
z] +) . *?(?: [a-z] [a-z] +) . *?(?: [a-z] [a-z] +) &BV. *?
```

The directory field returns the following regular expression:

```
\ \/StageOne\ \/Generic\ \/ (?: [a-z] [a-z] * [0-9] + [a-z0-
9] *) \ \/\ \d+\ \/\ \d+\ \/\ \d+ . *?\ \/\ \d+\ \/.
```

Assuming the rule is correct, the operator approves it. Processor 44 may request additional details such as rule name, category and direction of the traffic. The rule is assigned post, state and other elements automatically, as the processor identifies that the traffic comprises HTTP traffic. Processor 44 thus automatically generates the following IDS rule:

```
alert tcp $HOME_NET any -> $EXTERNAL_NET $HTTP_PORTS
(msg: "Microsoft WATSON traffic"; flow:to_server,
established; content: "GET"; nocase; http_method;
pcre:
"LCID=\ \d\ \d\ \d\ \d&OS=\ \d. . . . . . . . . . . . . . . . . . . . . . . . . . . .
. . . .&SM=(?: [a-z] [a-z] +) . (?: [a-z] [a-z] +) &SPN=(?: [a-
z] [a-z] +) . *?(?: [a-z] [a-z] +) . *?(?: [a-z] [a-
z] +) . *?(?: [a-z] [a-z] +) . *?(?: [a-z] [a-z] +) &BV. *?";
nocase; http_header;
pcre: "\ \/StageOne\ \/Generic\ \/ (?: [a-z] [a-z] * [0-
9] + [a-z0-9] *) \ \/\ \d+\ \/\ \d+\ \/\ \d+ . *?\ \/\ \d+\ \/";
nocase; http_header; classtype:suspicios-activity;
sid: 00000004;)
```

Processor 44 then provisions IDS 28 automatically with this rule via interface 40. In some embodiments, the new IDS rule is applied immediately to live traffic. In other embodiments, IDS 28 first tests the IDS rule, and applies it to live traffic only after verifying its performance.

In an example embodiment, the IDS may test the new rule on known sample traffic, or on a mixture of known sample traffic and live traffic, in order to measure the rule's false-positive performance. If the performance of the new rule is not sufficient, the operator may be prompted to fix it. Otherwise, the operator approves the use of the rule in the IDS, and the rule is then deployed directly in the IDS.

In some embodiments, processor 44 creates a regular expression in an IDS rule (for metadata and/or for data) automatically, based on the filtered traffic selected by the operator. Typically, the suggested regular expression is presented to the operator for approval or modification.

Figure 2:
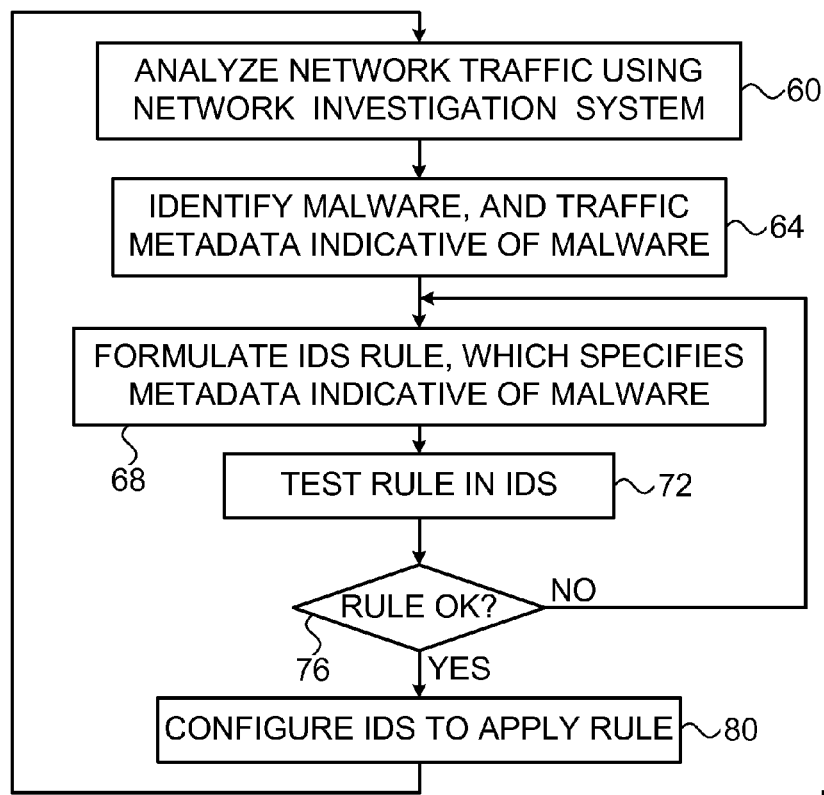
FIG. 2 is a flow chart that schematically illustrates a method for generating IDS rules, in accordance with an embodiment that is described herein.

FIG. 2 is a flow chart that schematically illustrates a method for generating IDS rules, in accordance with an embodiment that is described herein. The method begins with investigation system 24 analyzing the network traffic flowing into and/or out of protected network 22, at an analysis step 60.

As part of this analysis, an analyst uses the investigation system to identify malicious traffic by filtering the network traffic using various metadata filers, at a metadata-based filtering step 64. Investigation system 24 provides the metadata filters to rule generation system 20.

System 20, usually assisted by operator 52, formulates an IDS rule using the metadata filters obtained from system 24, at a rule formulation step 68. In some embodiments system 20 tests the performance of the IDS rule in IDS 28, at a testing step 72. If the performance of the IDS rule is satisfactory, as checked at a checking step 76, system 20 configures IDS 28 to apply the rule to live traffic, at a configuration step 80. Otherwise, the method loops back to step 68 above, and operator 52 is notified that the rule should be improved.

Although the embodiments described herein mainly address HTTP Command & Control traffic, the principles of the present disclosure can also be used for other protocols (e.g., DNS, SMTP, P2P, etc.), other exploitation mechanisms (e.g., Drive-by-download, vulnerability exploitation, 0-day exploits, etc.), other IDS/IPS systems (e.g. SNORT, BRO, Suricata, etc.), Network Anti-Virus, among others.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   receiving from a network investigation system one or more combinations of metadata parameters that have been identified by an analyst of the network investigation system as being indicative of malicious traffic within network traffic, wherein the receiving is performed by a first interface of an apparatus comprising the first interface, a second interface, and a processor;
   based on the received combinations of the metadata parameters, formulating, by the processor, one or more Intrusion Detection System (IDS) rules that identify the malicious traffic, wherein formulating the IDS rules comprises presenting both the network traffic and the combinations of metadata parameters to an operator on a computer terminal via a graphical user interface (GUI), wherein the GUI allows the operator to manipulate the presentation of the network traffic and the combinations of metadata parameters so as to find combinations of metadata parameter values that are characteristic of the malicious traffic, and upon finding the combinations of metadata parameter values that are characteristic of the malicious traffic, automatically generating, by the processor, an IDS rule that matches the found combinations; and
   configuring, by the processor via the second interface, an IDS to identify the malicious traffic in the network traffic, by provisioning the IDS with the IDS rules.

2. The method according to claim 1, wherein formulating the IDS rules comprises defining the rule based on data content of the network traffic in addition to the combinations of the metadata parameters.

3. The method according to claim 1, wherein presenting the network traffic to the operator comprises automatically selecting a partial subset of the combinations of the metadata parameters, and presenting, to the operator via the GUI, the network traffic filtered only in accordance with the selected partial subset.

4. The method according to claim 1, wherein automatically generating the IDS rule comprises automatically generating a regular expression that matches the found combinations.

5. The method according to claim 1, wherein configuring the IDS comprises verifying a performance of an IDS rule in the IDS prior to configuring the IDS to apply the IDS rule to live network traffic.

6. The method according to claim 5, wherein verifying the performance comprises requesting an operator to modify the IDS rule in response to detecting that the performance of the IDS rule is insufficient.

7. Apparatus, comprising;
   a first interface, for communicating with a network investigation system;
   a second interface, for communicating with an Intrusion Detection System (IDS);

a memory and a processor, which is configured to receive from the network investigation system over the first interface one or more combinations of metadata parameters that have been identified by an analyst of the network investigation system as being indicative of malicious traffic within network traffic, to formulate, based on the received combinations of the metadata parameters, one or more intrusion Detection System (IDS) rules that identify the malicious traffic, and, using the second interface, to configure an IDS to identify the malicious traffic in the network traffic, by provisioning the IDS with the IDS rules; wherein the processor formulates the IDS rules by at least presenting both the network traffic and the combinations of metadata parameters to an operator on a computer terminal via a graphical user interface (GUI), wherein the GUI allows the operator to manipulate the presentation of the network traffic and the combinations of metadata parameters so as to find combinations of metadata parameter values that are characteristic of the malicious traffic, and upon finding the combinations of metadata parameter values that are characteristic of the malicious traffic, automatically generating, by the processor, an IDS rule that matches the found combinations.

8. The apparatus according to claim 7, wherein the processor is configured to define the rule based on data content of the network traffic in addition to the combinations of the metadata parameters.

9. The apparatus according to claim 7, wherein the processor is configured to present the network traffic to the operator by at least automatically selecting a partial subset of the combinations of the metadata parameters, and presenting, to the operator via the GUI, the network traffic filtered only in accordance with the selected partial subset.

10. The apparatus according to claim 7, wherein the processor is configured to automatically generate the IDS rule by automatically generating a regular expression that matches the found combinations.

11. The apparatus according to claim 7, wherein the processor is configured to verify a performance of an IDS rule in the IDS prior to configuring the IDS to apply the IDS rule to live network traffic.

12. The apparatus according to claim 11, wherein the processor is configured to request an operator to modify the IDS rule in response to detecting that the performance of the IDS rule is insufficient.

* * * * *